Nov. 18, 1958   E. FROMWILLER   2,860,941
BUTTER DISPENSING APPARATUS
Filed April 12, 1954   3 Sheets-Sheet 3
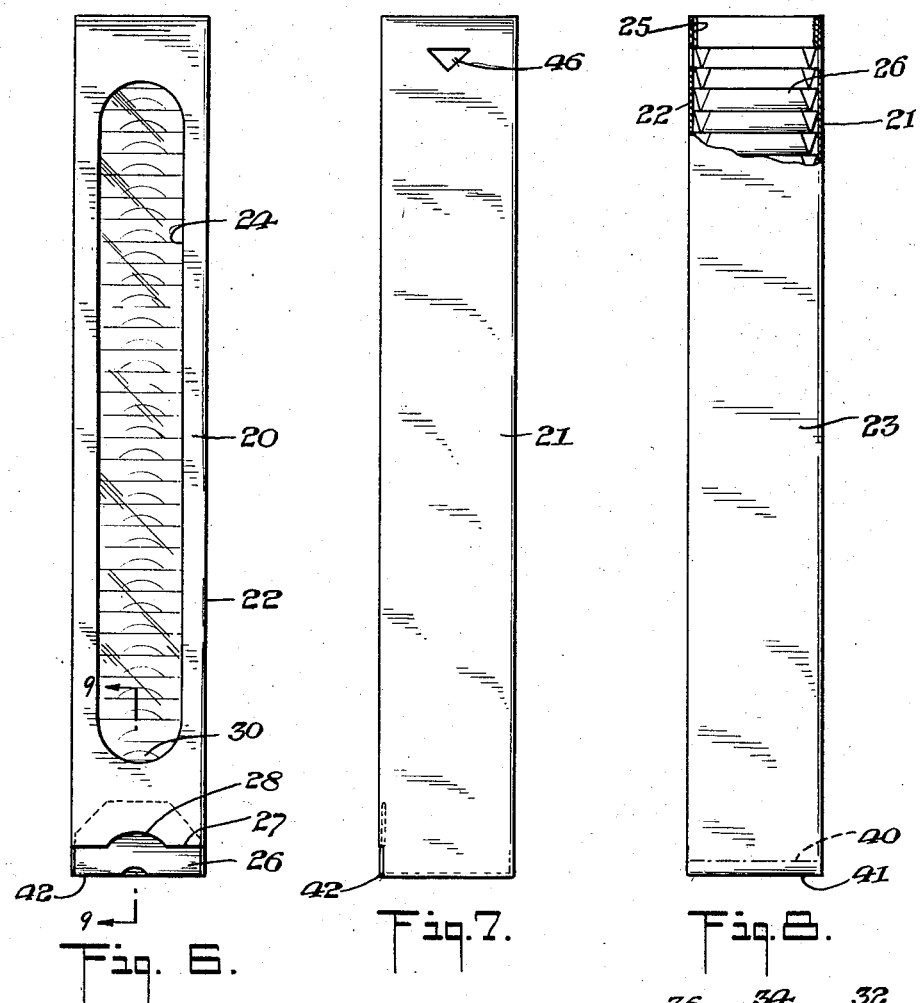
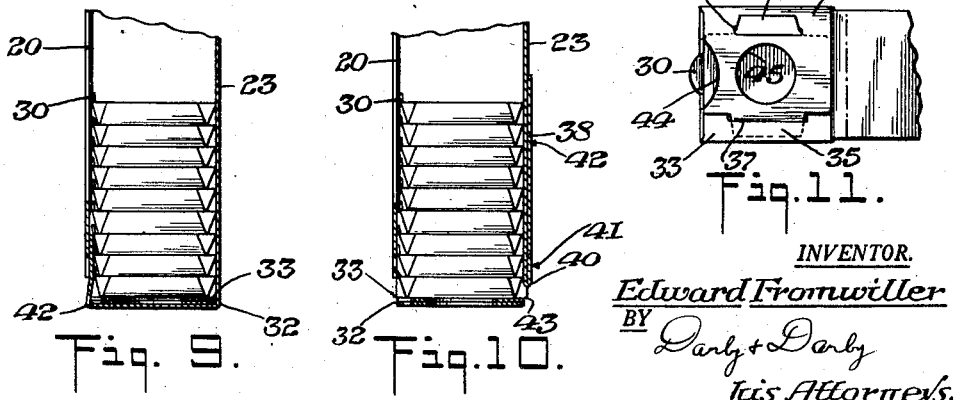
INVENTOR.
Edward Fromwiller
BY Darby & Darby
His Attorneys.

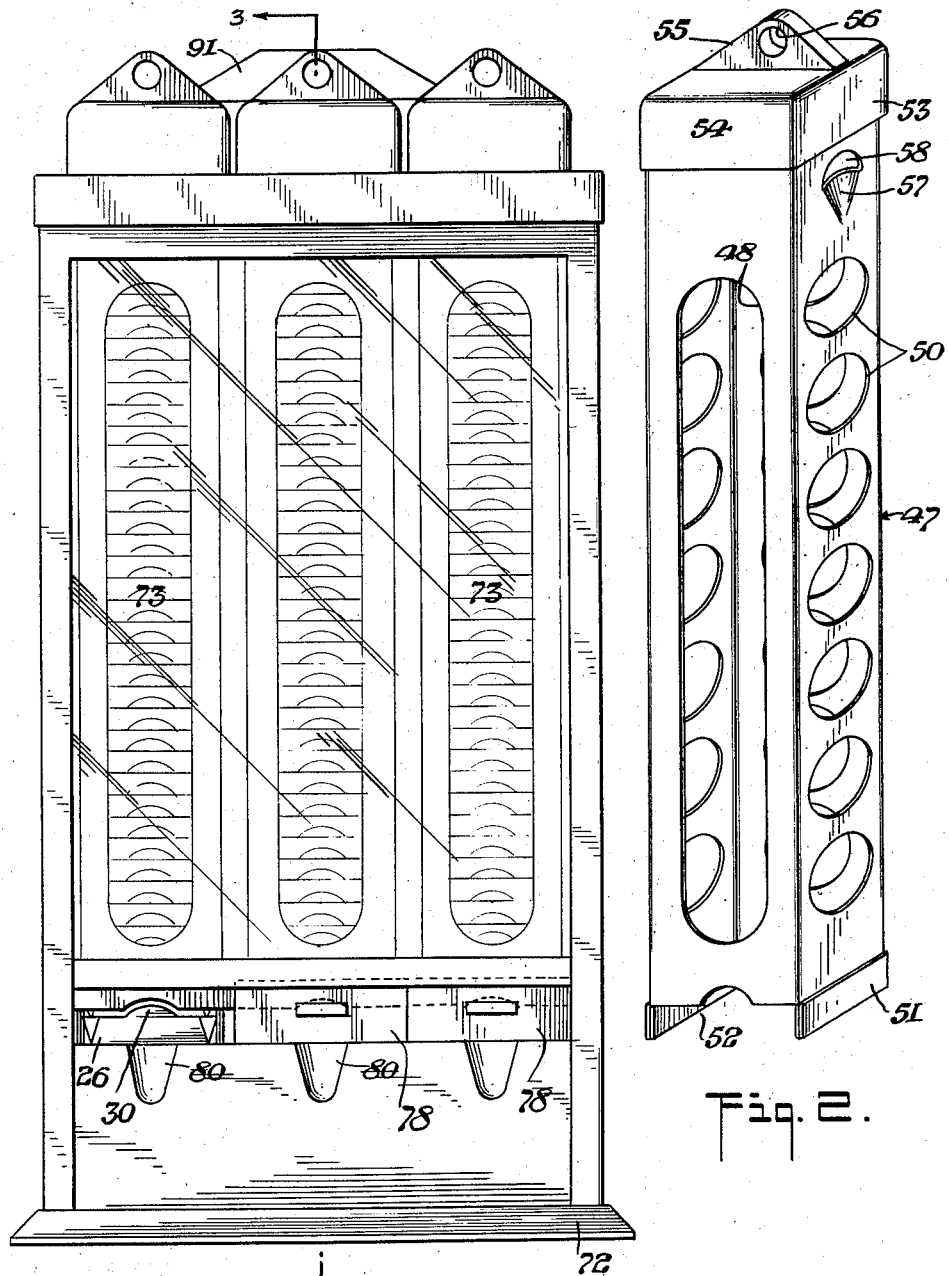

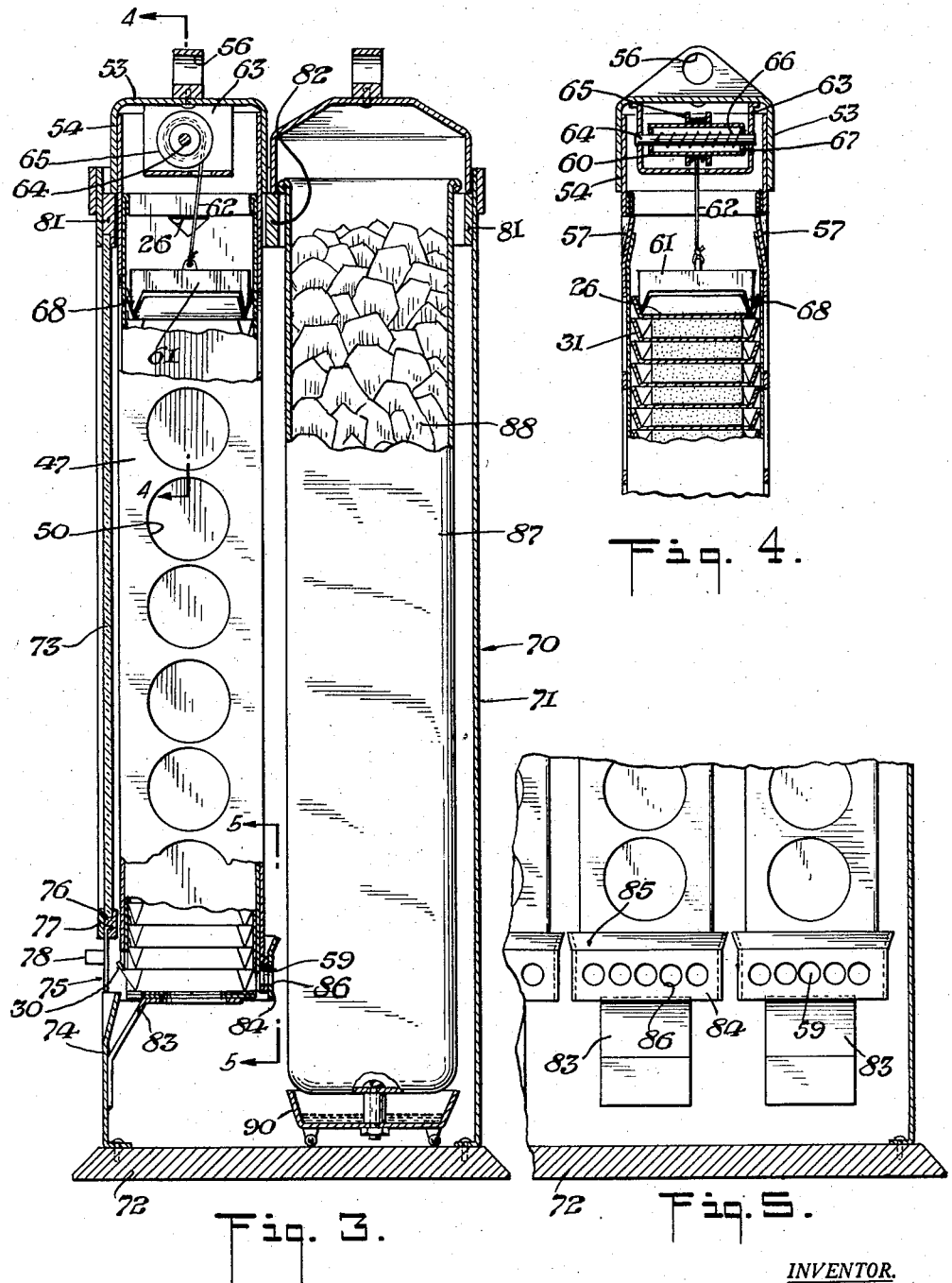

United States Patent Office 2,860,941
Patented Nov. 18, 1958

2,860,941

BUTTER DISPENSING APPARATUS

Edward Fromwiller, Richmond Hill, N. Y.

Application April 12, 1954, Serial No. 422,493

9 Claims. (Cl. 312—36)

The present invention relates to butter dispensing apparatus and particularly to a cartridge in which butter is loaded on paper butter plates and from which cartridge the butter may be readily removed one plate at a time.

Additionally, the invention comprises a holder for such butter cartridge which serves to retain the cartridge in a container in a chilled condition and which permits the ready removal of individual pats of butter on their individual paper butter plates.

More particularly still the invention relates to a cartridge in which paper butter plates of a particular form are inserted in any suitable manner, such for example, as by means of the machine disclosed in my copending application Serial No. 345,785, for "Automatic Butter Pat Dispenser" filed March 31, 1953, the butter plates being of such a form as to prevent nesting thereof thus assuring that each butter patty will be untouched by the bottom of the plate above it. The present application is a continuation-in-part of my prior copending application identified above.

The cartridge of this invention comprises a square tube formed of cardboard, plastic or the like having a bent-over edge at the top which serves to cooperate with the resilient paper butter plate to retain the filled butter plates within the tube. The cartridge further is provided with a closing flap which is arranged to be bent back along the rear edge of the cartridge when the cartridge is opened, thus exposing the lowermost one of the butter pats to direct contact with the chilled air present in the holder.

Further, the cartridge is provided with an opening extending across the lower portion of the front wall to substantially the height of one butter dish thereby giving access to the forward edge of that butter dish and making it possible to remove that dish from the stack. Since the removal opening necessarily exposes the butter upon the lowermost dish to the atmosphere, the opening in the rear is extremely beneficial in that it provides chilled air which flows over this lowermost butter pat and retains it in its unsoftened condition.

The individual butter plates or dishes are formed so that their upstanding walls have a tendency to extend at an angle from the base and they therefore exert a frictional pressure against the walls of the tube. Because of this resilience of the plates the forward edge of the lowermost plate will move outwardly with respect to the forward tube wall making it readily accessible and easily grasped by the fingers in order to remove this plate from the bottom of the stack.

The cartridge is also supplied with suitable openings in its side walls near the top which openings cooperate with the cartridge holder to retain the cartridge in the holder until such time as it is empty and is to be removed.

The cartridge holding apparatus includes a container which may contain a number of cartridges (in the particular instance shown being adapted to contain three cartridges) in definite position providing access to the lowermost pat of a single cartridge at any instant, the cartridges being individually removable so that the empty cartridge can be removed and replaced with a full one. This container also has a compartment in which ice may be placed so that the butter is kept at the proper temperature and does not soften in the cartridge.

It will, however, be understood that in some instances the cartridge may itself be utilized as a dispenser without any holder or container in which event it would be kept in a refrigerated space until such time as the entire contents thereof were to be dispensed.

It is an object of the invention to provide a butter dispensing cartridge having butter stacked therein on individual butter plates which are arranged so that they cannot nest.

It is another object of the invention to provide such a dispensing cartridge having a transparent panel in its forward wall so that the amount of butter remaining therein is readily discernible and having an opening at the lower end of its forward wall through which butter pats on individual dishes may be individually removed.

It is another object of the invention to provide such a butter dispensing cartridge having a closure flap so arranged that upon opening thereof the slot for removal of individual butter pats on individual dishes is exposed and in addition a similar slot in the lowermost portion of the rear wall is opened so that chilled air may flow over the lowermost butter pat.

It is a further object of the invention to provide such a butter cartridge having the individual butter plates stacked therein and having an empty butter plate at the top of the stack serving as a covering, this empty paper plate being retained in its closing position by means of an inwardly bent upper wall of the cartridge tube beneath which the outwardly flaring sides of the empty butter dish engage.

It is another object of the invention to provide such a butter dispensing cartridge having means for retaining the cartridge in an individual cartridge holder.

It is a further object of the invention to provide individual cartridge holders which have means for retaining the cartridge therein and which have a weight means therein which serves to cause the plates to move downwardly as a unit so that the lowermost plate is always accessible.

It is a still further object of the invention to provide a spring means by which the weight mentioned above is suspended so that the force exerted upon the butter is correlated with the resistance of the butter plates resulting from their friction against the walls of the cartridge tube.

It is a further object of the invention to provide means for mounting the individual cartridges in their holders within a container in such manner that butter can be withdrawn from but one of the cartridges at a time and also in such a manner as to cool the butter and maintain it in a proper condition for serving.

It is a further object of the invention to provide a butter cartridge having a bottom wall in which there is an aperture providing ready means for removing the cartridge from its individual holder.

Other objects and features of the invention will be apparent when the following description is considered in connection with the annexed drawings, in which, Figure 1 is a front elevation of a container for a plurality of individual butter dispensing cartridges held in individual holders;

Figure 2 is a perspective view of one of the individual holders for butter dispensing cartridges;

Figure 3 is a vertical cross-sectional view of the container of Figure 1, the view being taken along the plane of the line 3—3 of Figure 1, certain portions being left in elevation in order to show more clearly the relationship of the various parts;

Figure 4 is a fragmentary vertical cross-sectional view of a dispensing cartridge in its individual holder showing particularly the mode of suspending a weight from a spring roller;

Figure 5 is a fragmentary rear elevational view of the butter cartridge holders, the view being taken along the plane of the line 5—5 of Figure 3;

Figure 6 is a front elevation of a butter dispensing cartridge in its closed condition;

Figure 7 is a side elevation of the cartridge of Figure 6;

Figure 8 is a rear elevation, partly in section, of the cartridge of Figure 6 showing particularly the bent-over end at the top which serves to retain the cover dish and showing also the openings in the side walls of the cartridge which serve to retain the cartridge in the holder of Figures 2 through 5;

Figure 9 is a fragmentary vertical cross-sectional view of the cartridge of Figure 6, the view being taken along the plane of the line 9—9 of Figure 6 and showing the cartridge when it is closed for shipment;

Figure 10 is a view similar to Figure 9, but illustrating the cartridge when it has been opened so that butter pats on individual plates may be dispensed therefrom; and Figure 11 is a bottom plan view of the cartridge of Figure 6 showing particularly the aperture in the closure flaps extending from opposite sides which aperture is intended to provide a finger grip to aid in removing the cartridge from the individual holder therefor.

Referring now to the drawings and particularly to Figures 6 through 10, there is shown therein a butter cartridge which comprises a rectangular tube, having a front wall 20, a left-hand side wall (as seen in Figure 6) 21, a right-hand side wall 22, and a rear wall 23. The front wall 20 of the cartridge is provided with an elongated opening 24 which is covered by transparent material such for example as cellophane. The cartridge may be formed of cardboard or heavy paper or may be formed of a plastic material. In general, however, I prefer to use paper or cardboard since the cartridge is then disposable whereas when plastic material is used it would be preferable to reuse the cartridge.

The walls 20, 21, 22 and 23 of the cartridge are bent inwardly at the top forming the rim 25, this rim serving to hold an empty butter dish 26, which forms the cover for the cartridge, in position since the walls of this dish are, as are the walls of all dishes, formed to exert an outward pressure and, therefore, spring outwardly after passing beneath the lower edge of the rim 25 and lock the dish cover in position.

The front wall 20 of the cartridge terminates along a line 27 which is distant from the bottom substantially the height of a butter dish 26. The lower edge of the front wall 20 is provided with a notch 28, that is to say, the line 27 has an upward curve at the center portion thereof. This notched out portion 28 provides for egress of tabs 30 made integrally with the forward upstanding wall of the butter dish 26. Thus when a butter dish 26 bearing its pat of butter as indicated at 31 in Figure 4 reaches the lowermost position in the cartridge the forward upstanding wall of the dish springs outwardly, the tab moving through the notch 28 so that it may readily be grasped in the fingers and thus be removed from the cartridge.

The side walls 21 and 22 of the cartridge extend downwardly and are folded inwardly to form a bottom for the cartridge, these inwardly folded flaps being shown at 32 and 33 in Figures 9, 10 and 11, the folds being formed at a distance below the line 27 substantially equal to the height of a butter dish 26. The flaps 32 and 33 are interengaged by means of the narrow terminating portions 34 and 35 of the flaps 32 and 33 respectively, which portions pass through slots 36 and 37 in the flaps 33 and 32 respectively.

The rear wall 23 of the butter cartridge is formed with a flap 38 which is scored along the line 40, again along the line 41, and a third time along the line 42. This flap forms a bottom closure for the cartridge during shipment and extends downwardly across the side flaps 32 and 33 and thence upwardly and within the front 20 thus sealing the cartridge. When the cartridge is opened for use the flap 38 is folded upwardly along the score line 40 and lies against and parallel to the rear wall 23.

At this time the lowermost of the butter dishes 26 is exposed as described above and in addition is exposed through a space, designated 43, between the rear wall and the base of the cartridge formed by the side flaps 32 and 33. This space, as will later be described, communicates with vent holes in the cartridge holder and thus provides for access of chilled air to the lowermost butter pat which butter pat is exposed on its forward side to the atmosphere outside the container. Thus the chilled air is permitted to flow over the butter pat and maintain it at a proper consistency for serving.

The flaps 32 and 33 are provided with aligned notches indicated at 44 which aligned notches provide an opening rendering it easier to grasp the tab 30 of the butter dishes 26. Additionally, the flaps 32 and 33 are provided with aligned holes 45, see Figure 11, which serve as finger gripping means for removal of the empty cartridge from its individual holder. In addition the holes 45 facilitate loading of the cartridge by allowing ingress for a supporting plunger to support the butter dishes as they are loaded into a cartridge from the tube, the plunger being gradually withdrawn from the cartridge as the cartridge is filled. The cartridges may be filled with butter dishes by automatic machinery such as is described in my copending application Serial No. 345,785.

Each side wall 21 and 22 of the cartridge is provided with an opening 46 near the top thereof, these openings cooperating with members provided in the individual holders for retaining the butter cartridge in the holder during use, means being provided for releasing the holder means when the cartridge is empty and is to be removed.

As has been indicated, holders are provided for the individual butter cartridges just above described. One such holder is shown in perspective in Figure 2 and comprises a square tubular member 47, the interior dimensions of which are slightly greater than the exterior dimensions of a butter cartridge. The member 47 is provided with an elongated opening 48 in its front wall, this opening matching the opening 24 in the butter cartridge. The two sides and rear of the holder 47 are provided with openings 50 which provide for circulation of chilled air over the butter resting on the individual stacked dishes 26. The lower edges of the side and rear walls of the tubular member 47 are bent outwardly upon themselves as shown at 51 in order to provide a reenforcing rim and the front wall terminates above the side and rear walls in order to form an opening indicated at 52 matching the opening in the cartridge beneath the line 27 and forming a means for removing butter dishes with the butter thereon individually.

The rear wall and the reenforcing portion 51 thereof are provided with aligned holes 59 which holes are, as is seen particularly in Figure 3, in alignment with the opening 43 in the butter cartridge and thus permit a flow of chilled air over the lowermost butter pat as has been described above.

The butter cartridge holder further comprises a cover 53, the depending walls 54 of which extend over the walls of the tube 47 and are fastened thereto in any suitable manner as for example by welding. Cover 53 is provided with an upwardly extending projection 55 having a hole 56 therethrough forming a finger grip by means of which the individual holder may be removed from the refrigerating container shortly to be described.

Adjacent the cover 54 there is formed in each side wall of the tubular member 47 an inwardly projecting lip 57 which projection cooperates with the triangular cut outs 46 in the side walls of the butter cartridge to hold the cartridge in position. In other words, when the cartridge is inserted in the holder from the bottom, the side walls of the cartridge being resilient move inwardly as the cartridge is pushed upwardly into the holder and the side walls pass over the inward projections 57. When the upper edges of the triangular openings 46 have passed over the upper edges of the corresponding projections 57, the side walls, due to their inherent resiliency, spring back so that the cartridge is held in position. When it is desired to remove an empty cartridge from the holder it is only necessary to insert the fingers through the openings 58 in the side walls of the tubular member 47 thus pressing the side walls 21 and 22 of the cartridge inwardly and permitting the upper edges of the triangular openings 46 to slide past the projection 57.

Mounted in the cover 53 of the individual butter cartridge holder is a spring roller 60 from which a weight 61 is suspended by means of the cord 62 (see Figures 3 and 4). The spring roller 60 is supported in a bracket 63 which is suitably fixed to the underside of the cover 53. This spring roller comprises a shaft 64 fixed in the bracket 63. Mounted on the shaft 64 is the roller 60 which is provided with annular flanges 65 spaced along the roller 60 forming a reel. A spring 66 is coiled about the shaft 64, the spring being fastened at one end to one of the end members 67 of the roller 60 and at its other end to the shaft 64. Thus as the weight 61 descends the spring is wound and the pressure exerted by the weight 61 upon the stack of butter dishes 26 decreases as the number of dishes in the stack decreases. This provides a weight which is always proportional to the frictional resistance exerted by the outwardly flaring walls of the butter dishes upon the walls of the cartridge.

The weight 61 is provided with extensions 68 which extend downwardly at each of its four corners. These extensions are of pyramid-like shape and contact the corner folds of the butter dishes 26 as seen most clearly in Figure 3 and additionally make contact with the corner edges of the butter cartridge. Thus the extensions conform to the shape of the butter dish and extend axially along the cartridge for a sufficient distance to assure that the weight will remain horizontal as it descends. The weight 61 thus presses the stack of butter dishes downwardly with sufficient pressure so that the lower dish is always in position to be removed. At the same time the spring roller 60 is wound so that the pressure constantly diminishes as the number of dishes diminishes and consequently the friction of the dishes with the side walls of the cartridge diminishes.

When a cartridge is to be removed from the holder just described, it is only necessary to press the side walls of the cartridge inwardly through the openings 58 in the holder walls and to pull downwardly on the cartridge. This will remove the cartridge from the container, the empty butter dish forming the cover being removed with the cartridge. The downwardly extending corner projections 68 on the weight 61 prevent removal of the cover dish in the normal manner thus assuring that an empty dish will not be served. When the empty cartridge has been removed the new cartridge is inserted in the manner previously described and such insertion will cause the weight to move upwardly and arrive at its uppermost position.

In order that butter dishes with butter thereon may be maintained at a desired consistency and in order to form a convenient holder for a plurality of the individual holders just above described, I have provided a container or dispenser unit, shown particularly in Figures 1, 3 and 5.

This container, generally designated 70, is rectangular in cross-section, being formed of suitable material such for example as stainless steel. The rectangular tubular member 71 is mounted upon a base 72 and is provided with a glass or other transparent panel 73 which extends substantially entirely across the front thereof throughout the area occupied by the openings 24 in the butter cartridges and the aligned openings 48 in the individual butter holders.

Beneath the glass or transparent panel 73 is an opaque panel 74, this panel having a transversely extending slot 75 therein. Slightly mounted in a groove 76 in a member 77 are two doors 78 each of the width of an individual butter cartridge holder. The dimensions of the container 70 are such that there is space for three such butter cartridge holders across the container and since two doors are slidably mounted in the slot 76 it will be obvious that one butter cartridge is always exposed through the opening remaining and that the doors 78 may be shifted across the container so that any one but only one of the three butter holders may be exposed at any given instant.

The lower panel member 74 is provided with three conical indentations 80 which are aligned with the notches 44 in the flaps 32 and 33 so that a butter dish may readily be gripped by the fingers and removed from the butter cartridge.

Within the container 70 at the top thereof there is placed a rack which comprises a bar 81 bent into a rectangular form conforming to the interior of the container wall. Extending across the top is a bar 82 which divides the top frame into substantially two halves. Extending from the bar 82 forwardly are two bars (not shown in the drawings) which divide the forward portion of the rectangular frame formed by the bars 81 and 82 into three portions, each being substantially square in shape and of slightly greater interior dimensions than the exterior of an individual holder tube member 47, but of slightly lesser dimensions than those of the covers 53. By means of the bars 81, 82 together with the forwardly extending bars just mentioned, racks are formed on which the individual butter holders 47 are supported through the medium of their covers 53.

In order to assure that the lower edges of the holders 47 be properly positioned brackets 83 are fixed to the front panel 74 at spaced locations across the panel, the brackets being arranged to underlie the central portion of the individual butter cartridge. Supported on each of these brackets 83 is a three-sided framework 84 which has outwardly flaring upper side wall portions 85. These members 84 are dimensioned to fit the rim 51 of the individual butter holder tube 47 and thus definitely position the lower ends of the butter holders with respect to the openings in the front panel so that each butter cartridge lies directly behind one of the doors 78 or the space left open when such a door is slid aside.

Each of the members 84 is provided with a plurality of openings 86 which openings are in alignment with the openings 59 in the rear reenforcing rim 51 and rear portion of the lower wall of tubular butter holder member 47. By this means the individual butter holder is properly positioned in the container 70 without interference of the flow of chilled air across the lowermost butter pat as previously described.

In the rear portion of the container 70 a chilling medium is provided. As shown in the drawings this chilling medium comprises a can 87 which is adapted to contain ice as indicated at 88. This can 87 has fixed thereto at its base a tray 90 which is adapted to catch and retain any condensed moisture which may form on the walls of the can 87. As shown in the drawings the tray 90 rests upon the base 72 and in turn supports the can 87. However, any other suitable arrangement may be utilized for supporting this can.

The can 87 has placed thereover a cover 91 which is supported on the frame bar 81 and also upon the bar 82. As will be seen the ice 88 cools the can which in turn cools the air within the container and enters through the openings 50 in the holder 47 to maintain the butter pats within the butter cartridge at a proper temperature and consistency. It will of course be obvious that a refrigerating coil can be substituted for the ice 88 and its container 87 and that any other suitable means of refrigeration may be utilized.

As will be clear from the foregoing description the butter cartridge may be used alone as a disepnser, particularly in circumstances in which the entire contents thereof are to be dispensed in a short interval of time. If desirable, the butter cartridge in its individual holder may be utilized also as a dispenser under the same circumstances, this arrangement having the advantage that the weight is present and feeds the butter to a position in which the tabs on the dishes may be grasped by the fingers. However, if the butter is to be gradually removed from the cartridge, it is then preferable that the cartridges be placed in their individual holders and then in the container which has been described, since by this means each butter pat is maintained in a refrigerated condition and at proper consistency until it is removed from the dispenser and served.

While I have described preferred arrangements of my invention, I wish to be limited not by the foregoing description which was given solely for the purpose of illustration, but on the contrary to be limited only by the claims granted to me.

What is claimed is:

1. A dispensing cartridge for butter comprising, in combination, an elongated tube of rectangular cross-section, an inner rim at one end of said tube, a bottom at the opposite end of said tube, a plurality of butter dishes each having upwardly extending side walls within said tube, each dish having a pat of butter thereon, said dish side walls having inherent resiliency and pressing outwardly against the side walls of said tube, said tube maintaining said dish side walls erect to prevent contact between the butter on one of said dishes and the bottom of the dish next above said one dish, and an opening in one wall of said container adjacent said bottom, said opening permitting one of the resilient walls of an individual dish to protrude from said container whereby said dish may readily be removed from said container, each said butter dish being provided with a projecting tab on one side wall thereof, said dishes being arrayed in said cartridge so that the said tabs press against the side wall having an opening therein, said side wall opening being provided with an upwardly extending notch through which the tab on the lowermost butter dish extends due to the resiliency of the said side wall of said dish.

2. A dispensing cartridge for butter comprising, in combination, an elongated tube of rectangular cross-section, an inner rim at one end of said tube, a bottom at the opposite end of said tube, a plurality of butter dishes each having upwardly extending side walls within said tube, each dish having a pat of butter thereon, said dish side walls having inherent resiliency and pressing outwardly against the side walls of said tube, said tube maintaining said dish side walls erect to prevent contact between the butter on one of said dishes and the bottom of the dish next above said one dish, and an opening in one wall of said container adjacent said bottom, said opening permitting one of the resilient walls of an individual dish to protrude from said container whereby said dish may readily be removed from said container, each said butter dish having inwardly folded portions joining the side walls thereof, said corner folds projecting inwardly of the base of said dish and serving to stiffen said dishes and provide means for preventing nesting of said dishes in said cartridge.

3. A device as claimed in claim 2, characterized in that a rectangular weight is provided, said weight having substantially the dimensions of the interior of said tube and said weight having downwardly extending projections of pyramid form, said projections lying outside said inwardly folded corner portions of the uppermost one of said butter dishes whereby said weight urges said dishes downwardly to present the lowermost dish for ready removal through said opening in said tube wall, and further characterized in that said downard projections of said weight prevent the removal of the uppermost one of said butter dishes.

4. A device as claimed in claim 2 further including a holder for said tube, said holder comprising a tubular member of rectangular cross-section, said holder having inwardly facing projections on opposite walls thereof adjacent one end, said projections being struck out from said walls and being adapted to cooperate with openings in corresponding side walls of said tube to retain the tube in said holder, said struck out portions providing openings in said holder side walls through which the walls of the cartridge may be pressed inwardly to release the cartridge from said holder.

5. A holder for a butter dispensing cartridge as claimed in claim 4 characterized in that a plurality of openings are formed in the side walls of said tubular member, said openings permitting access of air to a cartridge retained in said holder.

6. A holder for a butter dispensing cartridge as claimed in claim 4, characterized in that said tubular member has a reenforced rim on three sides thereof at the end opposite said projections, the remaining wall of said tubular member terminating above said reenforced rim portion of said three walls to thereby form an opening through which butter dishes may be removed from a cartridge retained in said holder.

7. A holder for a butter dispensing cartridge, said holder comprising a tubular member of rectangular cross-section said holder having inwardly facing projections on opposite walls thereof adjacent one end, said projecting being struck out from said walls and being adapted to cooperate with openings in corresponding side walls of a butter cartridge to retain the butter cartridge in said holder, said struck out portions providing openings in said holder side walls through which the walls of the cartridge may be pressed inwardly to release the cartridge from said holder, said tubular holder being provided with a cover, a roller mounted in said cover, a spring urging said roller in one direction and a weight suspended from said roller and urging said roller in the opposite direction, said weight cooperating with the butter dishes in a butter dispensing cartridge to move the butter dishes sequentially to a position from which they can be removed from the cartridge.

8. A holder for a butter dispensing cartridge as claimed in claim 7, characterized in that said roller spring is tensioned as said weight moves through a butter cartridge, said tension produced by said spring being correlated with said weight and with the pressure of the resilient walls of the butter dishes against the walls of a butter cartridge so that as the number of dishes within the cartridge decreases the effective weight decreases proportionately.

9. A container for a plurality of butter cartridge holders, said container comprising a tubular member having a base, a plurality of tubular butter holders mounted therein, said butter holders being provided with openings in the lower edges of their forward walls through which butter dishes may be removed, the front of said holders being placed adjacent the front wall of said container, each said container being provided with a slot extending across the front thereof in alignment with said openings, said slot being provided with doors slidable thereon, each door having a width equal to the width of a butter holder, and there being one less door than butter holders whereby one and only one of said butter holders may have a butter dish removed therefrom at any instant, and a chilling means mounted in said container.

References Cited in the file of this patent

UNITED STATES PATENTS

| | | |
|---|---|---|
| 1,404,302 | Krieter et al. | Jan. 24, 1922 |
| 1,633,588 | Klinenberg | June 28, 1927 |
| 1,666,575 | Lee | Apr. 17, 1928 |
| 1,725,372 | Richman | Aug. 20, 1929 |
| 1,741,474 | Moore | Dec. 31, 1929 |
| 1,850,254 | Zimmerman | Mar. 22, 1932 |
| 1,964,597 | Rapellin | June 26, 1934 |
| 1,973,903 | King | Sept. 18, 1934 |
| 1,975,540 | Folger | Oct. 2, 1934 |
| 1,980,819 | Nelson | Nov. 13, 1934 |
| 2,037,723 | Heineman | Apr. 21, 1936 |
| 2,081,177 | Hope | May 25, 1937 |
| 2,112,960 | Harvey | Apr. 5, 1938 |
| 2,256,074 | Crebbs | Sept. 16, 1941 |
| 2,340,089 | Vineburgh | Jan. 25, 1944 |

FOREIGN PATENTS

| | | |
|---|---|---|
| 369,066 | Italy | Mar. 10, 1939 |
| 497,293 | Great Britain | Dec. 16, 1938 |